(12) United States Patent
Matsubara et al.

(10) Patent No.: US 7,839,039 B2
(45) Date of Patent: Nov. 23, 2010

(54) BRUSHLESS MOTOR

(75) Inventors: Ken Matsubara, Matsubara (JP);
Tomofumi Takahashi, Kasugai (JP);
Tetsuo Horie, Kasugai (JP); Minoru Kitabayashi, Kasugai (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 0 days.

(21) Appl. No.: 11/819,280

(22) Filed: Jun. 26, 2007

(65) Prior Publication Data

US 2008/0174191 A1 Jul. 24, 2008

(30) Foreign Application Priority Data

Jun. 27, 2006 (JP) .............................. 2006-176635

(51) Int. Cl.
*H02K 5/16* (2006.01)
*H02K 7/08* (2006.01)
*H02K 1/00* (2006.01)

(52) U.S. Cl. ........................ 310/90; 310/91; 310/156.01

(58) Field of Classification Search .................... 310/89, 310/90, 216, 218, 91; *H02K 1/00, 5/16, 7/08*
See application file for complete search history.

(56) References Cited

U.S. PATENT DOCUMENTS

| 3,068,975 | A | * | 12/1962 | Theuer ..................... 192/223.3 |
| 3,786,289 | A | * | 1/1974 | Baclawski et al. ............ 310/90 |
| 4,613,778 | A | * | 9/1986 | Wrobel et al. ................. 310/90 |
| 5,051,632 | A | * | 9/1991 | Lautner et al. ......... 310/216.034 |
| 6,133,661 | A | * | 10/2000 | Okawa et al. .................. 310/90 |
| 6,717,314 | B2 | * | 4/2004 | Horst et al. ............ 310/156.43 |
| 6,952,062 | B1 | * | 10/2005 | Mancl et al. .................... 310/90 |
| 7,548,003 | B2 | * | 6/2009 | Nickel-Jetter et al. ......... 310/90 |
| 2002/0185927 | A1 | * | 12/2002 | Chihara et al. ................ 310/89 |
| 2004/0061410 | A1 | * | 4/2004 | Ando et al. .................. 310/218 |
| 2005/0012417 | A1 | * | 1/2005 | Fasterding et al. ............ 310/90 |
| 2005/0018935 | A1 | * | 1/2005 | Simpson et al. ............. 384/204 |
| 2005/0225194 | A1 | * | 10/2005 | Murakami et al. .......... 310/216 |

(Continued)

FOREIGN PATENT DOCUMENTS

JP 6-303752 A 10/1994

(Continued)

OTHER PUBLICATIONS

Ball_bearing.pdf (wikipedia.com).*

(Continued)

*Primary Examiner*—Burton Mullins
*Assistant Examiner*—John K Kim
(74) *Attorney, Agent, or Firm*—Birch, Stewart, Kolasch & Birch,LLP

(57) ABSTRACT

A rotary shaft of a rotor including a magnet with a plurality of magnetic poles arranged at equal intervals on an outer circumference is supported at both ends by bearings. By externally fitting the inner ring of one bearing to the rotary shaft and holding it to be immovable in an axial direction and loosely fitting the outer ring of the bearing into the support hole and positioning it with belleville springs which are in contact resiliently with both sides, the rotary shaft and the rotor are supported so that they are movable in an axial direction within a movement amount of not greater than 2 mm according to a movement of the bearing caused against spring forces of the belleville springs.

3 Claims, 5 Drawing Sheets

U.S. PATENT DOCUMENTS

| | | | |
|---|---|---|---|
| 2005/0269895 A1* | 12/2005 | Innami et al. | 310/218 |
| 2006/0043805 A1* | 3/2006 | Bradfield | 310/68 D |
| 2006/0170299 A1* | 8/2006 | Maley et al. | 310/90 |

OTHER PUBLICATIONS

Ball_bearing.pdf, Sep. 2008.*

Miller_ch4.pdf : Miller et al, Design of Permanent Magnet Motors, 1994.*

J.R. Hendershot Jr et al, Design of Brushless Permanent-Magnet Motors, 1994: Magna Physics Publishing and Clarendon Press, Oxford, pp. 3-6, 3-7, 3-10, 3-11, 3-32 and 3-33.*

* cited by examiner

F I G. 3
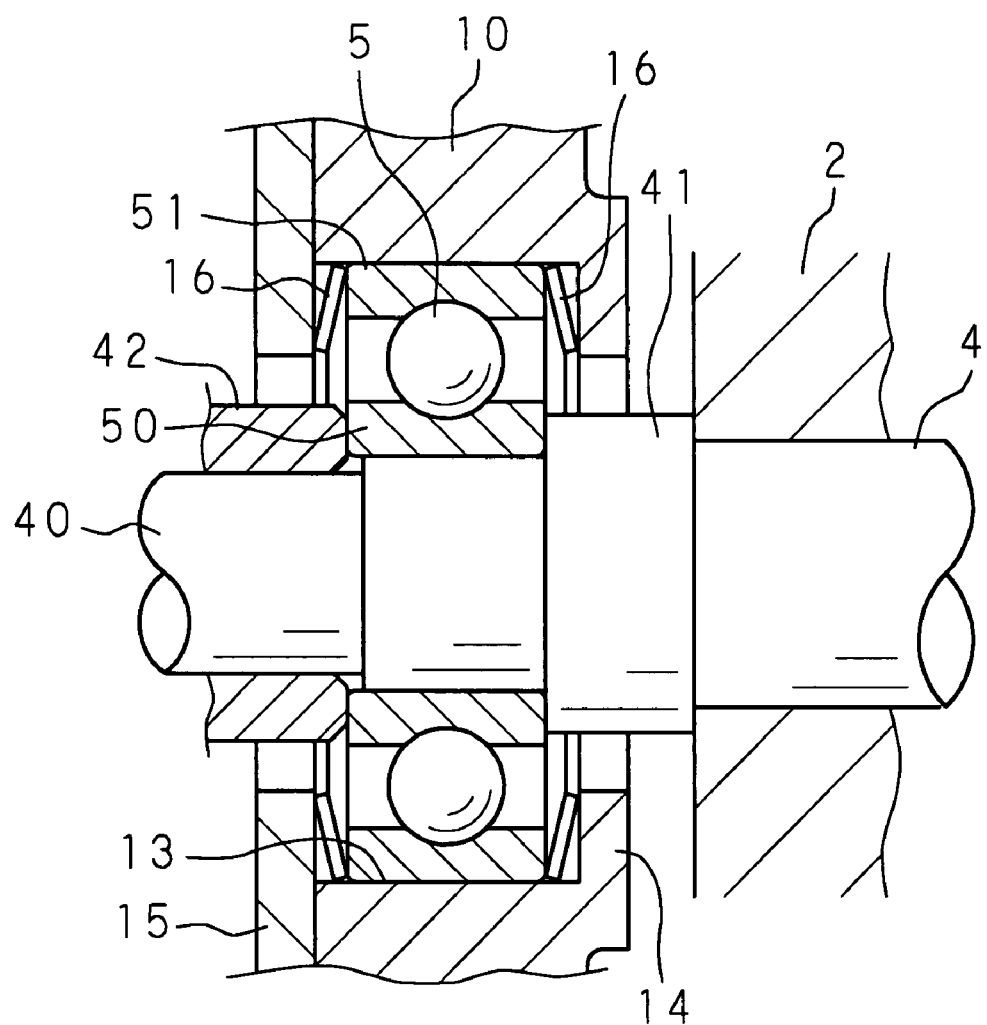

F I G. 4
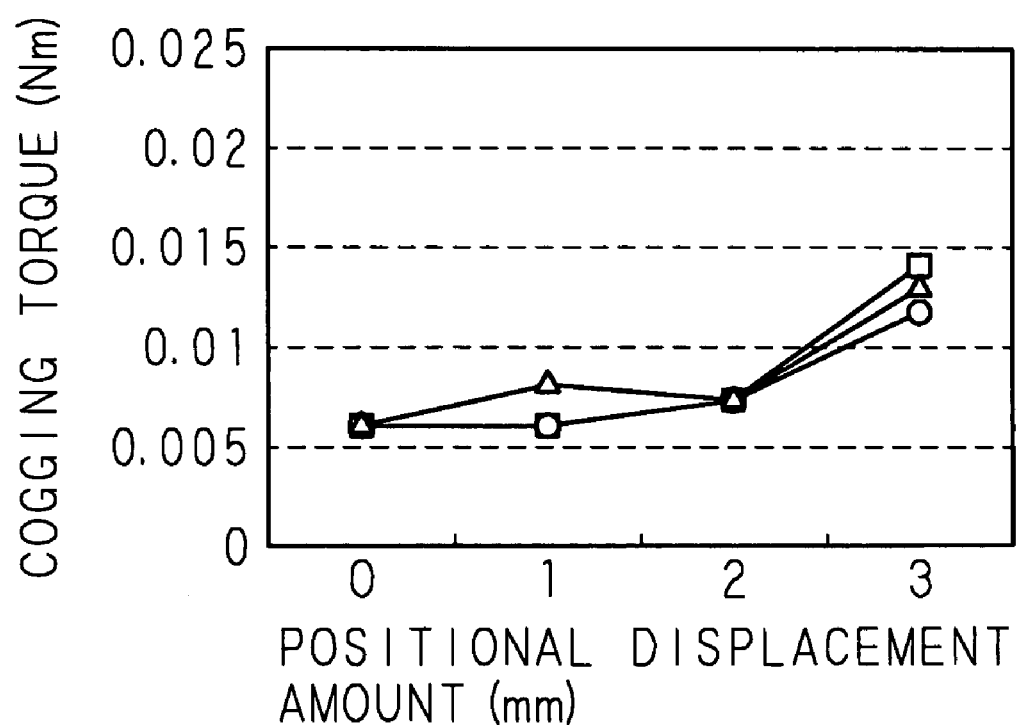

BRUSHLESS MOTOR

CROSS-REFERENCE TO RELATED APPLICATION

This non-provisional application claims priority under 35 U.S.C. §119(a) on Patent Application No. 2006-176635 filed in Japan on Jun. 27, 2006, the entire contents of which are hereby incorporated by reference.

BACKGROUND

1. Technical Field

The present invention relates to a brushless motor for use as a steering-assist motor in an electric power steering apparatus.

2. Description of Related Art

In an electric power steering apparatus which assists steering by driving a steering-assist motor according to a rotating operation of a steering member such as a steering wheel and applying the torque of the motor to a steering mechanism, a brushless motor is widely used as a steering-assist motor (see, for example, Japanese Patent Application Laid-Open No. 6-303752 (1994)).

A brushless motor comprises a cylindrical rotor which is rotatably supported by a rotary shaft in a housing so that it faces the inner side of a stator fixed to the inner circumferential surface of the housing. The rotor comprises a magnet having a plurality of magnetic poles on the outer circumferential surface, while the stator comprises stator coils constructed by winding wires around a plurality of projections, which are provided at equal intervals in a circumferential direction to protrude inward, by using slots between the respective projections. A rotating magnetic field is produced inside the housing by controlling the supply of power to these stator coils, and the torque is applied to the magnet in the rotating magnetic field to rotate the rotor.

The brushless motor is realized by suitably setting a combination of the number of magnetic poles (pole number p) on the outer circumference of the rotor and the number of slots (slot number n) arranged in the inner circumference of the stator. As a steering-assist motor in an electric power steering apparatus, a brushless motor in which the ratio of slot number n to pole number p (=n/p) is within a range of 1.2 to 1.5, such as a brushless motor with 8 poles and 12 slots, or 10 poles and 12 slots, has been widely used.

SUMMARY

For a brushless motor for use in an electric power steering apparatus, it is required to increase the motor efficiency in order to meet the demand for size reduction, and producing smooth and stable rotations is a very important issue to improve the steering feeling.

In order to improve the motor efficiency, it is effective to reduce mechanical losses caused by the rotation of the rotor. The mechanical losses in the rotor are mostly the friction losses in the bearing which supports the rotor. It is possible to significantly reduce the friction losses by adopting a support structure in which no pre-load is applied to the bearing.

On the other hand, cogging is one element that interferes with the stable rotation of the brushless motor. Cogging occurs due to a change in the amount of magnetic flux caused by the relative positional relationship on the structure between the stator and the rotor. Even at both ends in the axial direction, leakage magnetic flux may change due to a positional displacement between the stator and the rotor. Consequently, the rotational torque applied to the rotor varies, and the rotation of the rotor becomes unstable. The fluctuating component of rotation torque due to such cogging, or so-called cogging torque, can be reduced by making the axial length of the stator sufficiently larger than the axial length of the rotor and eliminating the influence of leakage magnetic flux at both ends of the stator. However, since this countermeasure causes an increase in the size of the motor, it is difficult to use it in an application requiring a reduction in the size of the motor, such as a brushless motor for an electric power steering apparatus.

Therefore, in a prior art, cogging torque is prevented and stable rotation is realized by using a rotor having a substantially equal axial length to a stator and adopting a support structure in which the rotor is held to be immovable in the axial direction.

However, in order to certainly lock the movement of the rotor in the axial direction, it is necessary to apply a pre-load to the bearing which supports the rotor to eliminate the gaps between the bearing and the housing and rotor, and it is also necessary to eliminate the gap existing inside the bearing. When such a support structure under pre-load is adopted, friction losses due to the rotation of the rotor increase and the motor efficiency is decreased as described above, and consequently the motor becomes larger.

Thus, for a brushless motor to be used as a steering-assist motor in an electric power steering apparatus, it is required to decrease the size of the motor itself by reducing the friction losses in the support section of the rotor and increasing the motor efficiency, and it is also required to realize a stable rotation by preventing cogging torque. However, it is difficult to satisfy these requirements together.

In order to solve the above problems, it is an object to provide a brushless motor capable of achieving both a reduction of friction losses in the support section of the rotor and prevention of cogging torque, and capable of realizing both high motor efficiency and stable rotation by examining the relationship between cogging torque and the movement of the rotor in an axial direction and adopting a rotor support structure which allows a movement in the axial direction within a range in which excessive cogging torque is not generated.

A brushless motor according to a first aspect is characterized by a brushless motor comprising: a rotor including a magnet and rotatably supported by a rotary shaft, said magnet having magnetic poles to the number of p arranged at equal intervals on an outer circumference; and a stator stationarily mounted to surround an outside of said rotor, said stator including slots to the number of n arranged at equal intervals in an inner circumference, wherein the ratio n/p of n to p is set between 1.2 and 1.5, and said rotor is supported so that it is movable in an axial direction within a movement amount of not greater than 2 mm.

Moreover, a brushless motor according to a second aspect is characterized in that the axial length of the rotor is substantially equal to the axial length of the stator.

Further, a brushless motor according to a third aspect is characterized in that the rotor is supported at both ends by two deep-groove ball bearings to which no pre-load is applied.

In the brushless motor according to the first aspect, since the rotor is supported in a support mode in which it is movable in the axial direction, it is possible to reduce the friction losses at the support section of the rotor, and it is possible to realize high motor efficiency. Moreover, since the movement amount of the rotor in the axial direction is limited to 2 mm or less to prevent excessive cogging torque, based on the results of examining the relationship between the movement of the rotor in the axial direction and cogging torque, it is also possible to realize smooth rotation.

In a brushless motor according to the second aspect, since the axial length of the rotor and that of the stator are substantially equal, it is possible to realize improved motor efficiency and stable rotation without increasing the size.

Further, in a brushless motor according to the third aspect, since deep-groove ball bearings are used as bearings for supporting the rotor under the above-mentioned condition, it is possible to produce advantageous effects, such as it is possible to realize improved motor efficiency and stable rotation at low costs.

The above and further objects and features will more fully be apparent from the following detailed description with accompanying drawings.

BRIEF DESCRIPTION OF THE SEVERAL VIEWS OF THE DRAWINGS

FIG. 3 is an enlarged view of the periphery of a supported section by a bearing on one side of a rotor;

FIG. 4 is a view showing the result of examining cogging torque behavior; and

DETAILED DESCRIPTION

Figure 1:
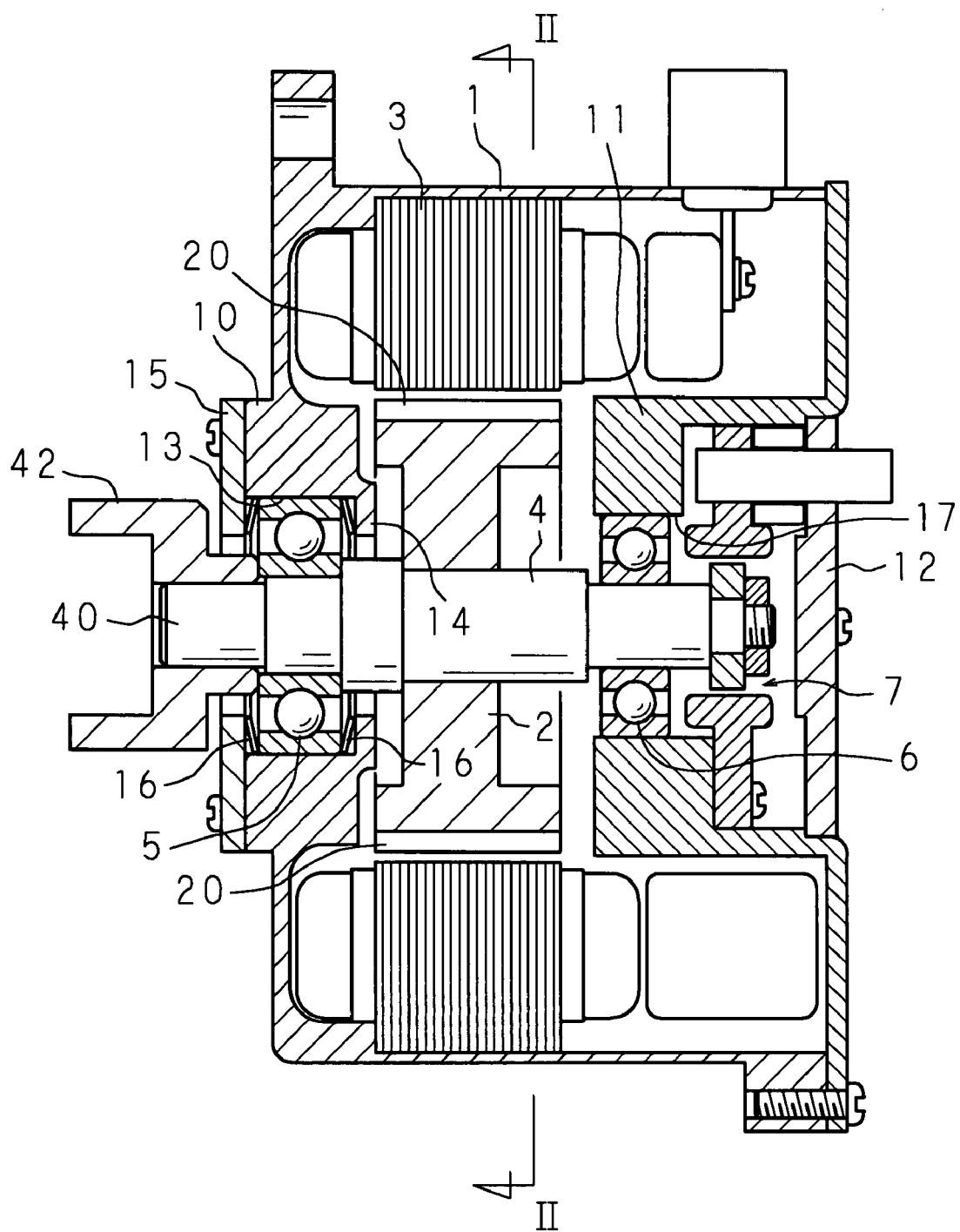
FIG. 1 is a vertical sectional view schematically showing the entire structure of a brushless motor.

The following description will explain an embodiment with reference to the drawings. FIG. 1 is a vertical sectional view schematically showing the entire structure of a brushless motor, and FIG. 2 is a transverse sectional view along the II-II line of FIG. 1.

Figure 2:
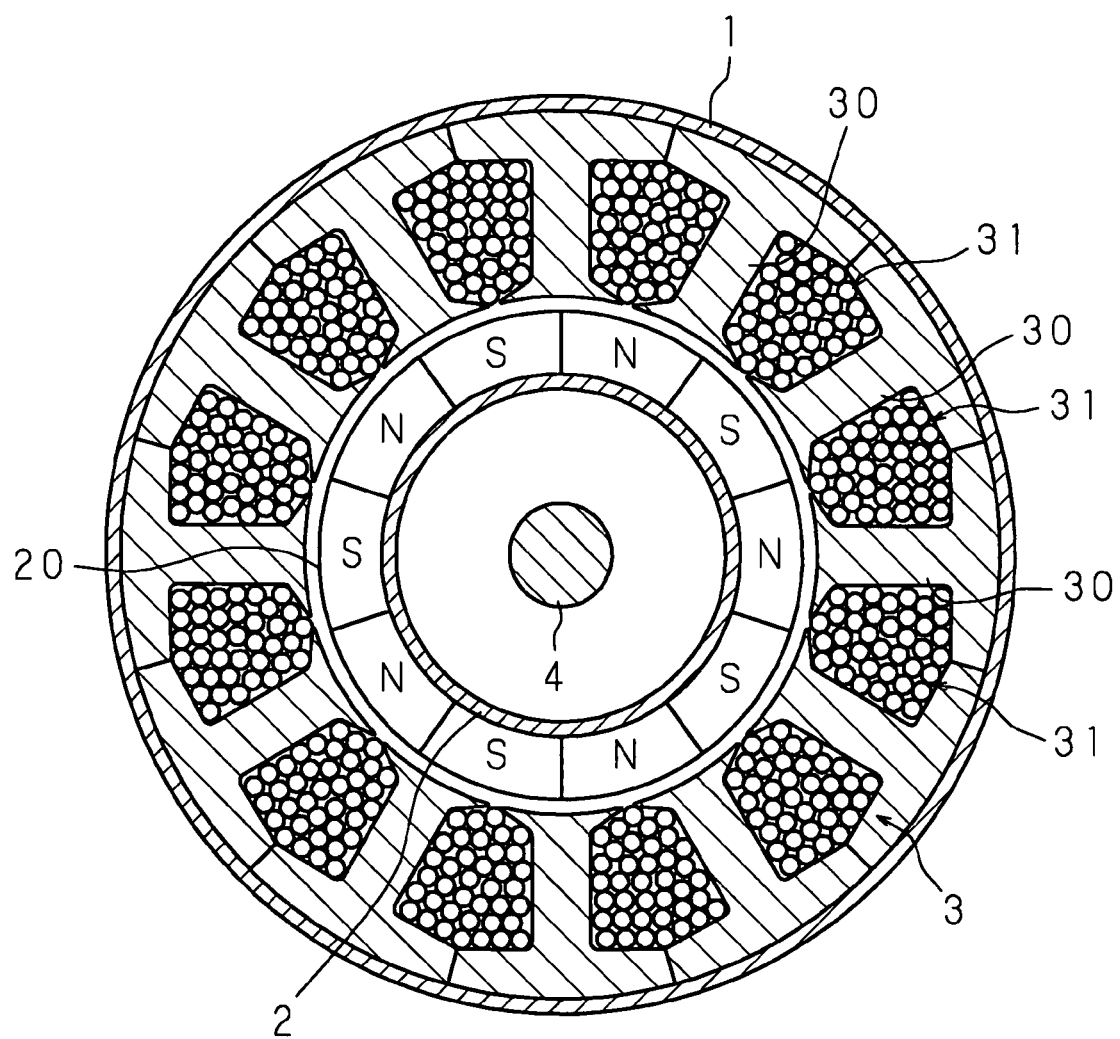
FIG. 2 is a transverse sectional view along the II-II line of FIG. 1.

As shown in FIGS. 1 and 2, the brushless motor comprises a rotor 2 and a stator 3 in a thin cylindrical-shaped housing 1. The rotor 2 is a cylinder made of a soft magnetic material with high permeability, and comprises a magnet 20 having a plurality of magnetic poles (10 magnetic poles in FIG. 2) arranged at equal intervals on the outer circumferential surface as shown in FIG. 2.

A rotary shaft 4 is coaxially fitted into the axial center of the rotor 2. The rotor 2 is rotatably supported at both ends in the housing 1 by supporting the protruding parts of the rotary shaft 4 extending to both sides in the axial direction by both end walls 10, 11 of the housing 1 through separate deep-groove ball bearings (hereinafter simply referred to as the bearings) 5, 6 as to be described later.

One end of the rotary shaft 4 is suitably extended to the outside of the housing 1 through the supported section by the bearing 5 located on the same side, and forms an output terminal 40 for outputting the rotation of the rotor 2. On the other hand, the other end of the rotary shaft 4 is suitably extended through the supported section by the bearing 6 located on the same side. In this extended section, a resolver 7 is formed in the space enclosed by the end wall 11 and an end cover 12 located on the same side. Since the resolver 7 is a known detector widely used to detect the rotational position of the rotor 2, the detailed explanation of its structure and operation is omitted.

The stator 3 is constructed as a cylinder comprising a plurality of pieces of thin silicon steel plates placed one upon another in an axial direction; a plurality of (12 in FIG. 2) cores 30, 30 . . . projecting inward and arranged at equal intervals in a circumferential direction as shown in FIG. 2; and slots 31, 31 . . . between the cores. For each of the cores 30, 30 . . . , a stator coil is formed by winding a wire through the slots 31, 31 . . . between the respective cores. Note that the stator 3 shown in FIG. 2 is divided into 12 parts in a circumferential direction for each of the cores 30, 30 . . . and integrated by pushing them into the housing 1 or a special retaining cylinder.

The stator 3 thus constructed has an axial length substantially equal to the rotor 2, and is fitted and fixed into the housing 1 so that the cores 30, 30 . . . projecting to the inner circumference are aligned with the magnet 20 on the outer circumference of the rotor 2 in the axial direction and face the magnet 20 with a slight air gap in a radial direction between them.

The brushless motor supplies power sequentially to the coils placed on the inner circumference of the stator 3 in the same manner as in the prior art, generates a rotational magnetic field inside the stator 3, and is thereby rotationally driven. A plurality of magnetic poles of the magnet 20 on the outer circumference of the rotor 2 are positioned within the rotational magnetic field produced by the supply of power to the stator 3, and rotational torque is applied to the respective magnetic poles. A rotation of the rotor 2 caused by the function of the rotational torque is outputted from the output terminal 40 on one side of the rotary shaft 4. Meanwhile, the rotational position of the rotor 2 is detected by the resolver 7 provided on the other side of the rotary shaft 4 and used as feedback information for controlling the supply of power to the stator 3.

The brushless motor is characterized by the structure of supporting the rotary shaft 4 by the bearings 5, 6 which support the rotary shaft 4 on both sides of the rotor 2, and more particularly by the structure of supporting it by the bearing 5 located on the same side as the output terminal 40.

FIG. 3 is an enlarged view of the periphery of the supported section by the bearing 5 on one side of the rotor 2. As shown in FIG. 3, an inner ring 50 of the bearing 5 is externally fitted to the rotary shaft 4, held from both sides by a large-diameter section 41 in the middle of the rotary shaft 4 and a coupling 42 fitted to the output terminal 40, and fixed to be immovable in the axial direction. On the other hand, an outer ring 51 of the bearing 5 is loosely fitted into a support hole 13 in the end wall 10 located on the same side of the housing 1 so that it is movable in the axial direction, and faces a bottom wall 14 of the support hole 13 and a lid plate 15 for closing the opening of the support hole 13 with a predetermined gap therebetween. Belleville springs 16, 16 interposed between the outer ring 51 and the bottom wall 14 and lid plate 15, respectively, are resiliently in contact with both sides of the outer ring 51.

With the above-mentioned structure, the outer ring 51 of the bearing 5 is positioned in the center of the support hole 13 by the balance of spring forces of belleville springs 16, 16 in contact resiliently with both sides of the outer ring 51. However, when a force in an axial direction is applied, the outer ring 51 can move within the range of the gap between the outer ring 51 and each of the base wall 14 and the lid plate 15 against the spring forces of the belleville springs 16, 16. Since the inner ring 50 of the bearing 5 is fixed in the middle of the rotary shaft 4 so that it is immovable in the axial direction, the rotary shaft 4 and the rotor 2 fixed to the rotary shaft 4 can move together with the inner ring 50 in the axial direction according to the movement of the outer ring 51 of the bearing 5 caused in the support hole 13.

As shown in FIG. 1, the other bearing 6 supports the rotary shaft 4 rotatably by externally fitting the inner ring to the middle of the rotary shaft 4 and internally fitting the outer ring into a support hole 17 formed in the other end wall 11 of the housing 1. Fitting the internal and outer rings of the bearing 6 to the rotary shaft 4 or the support hole 17 is performed by tightly fitting one of them under a predetermined tolerance and loosely fitting the other of them under a predetermined tolerance. For example, when the outer ring of the bearing 6 and the support hole 17 are tightly fitted and the inner ring of the bearing 6 and the rotary shaft 4 are loosely fitted, the bearing 6 is held so that it is immovable in the axial direction with respect to the housing 1 having the support hole 17, but is movable in the axial direction with respect to the rotary shaft 4, thereby allowing movements of the rotary shaft 4 and the rotor 2 in the axial direction by slide between the inner ring and the rotary shaft 4.

In the bearings 5, 6 which support the rotor 2 as described above, at least one of the internal and outer rings is loosely fitted to the housing 1 or the rotary shaft 4, and no pre-load is applied to both the bearings 5, 6. Therefore, the above-mentioned rotation of the rotor 2 is produced under small friction losses caused by smooth rolling movements of the two bearings 5, 6, and it is possible to limit a decrease in the efficiency caused by the friction losses and realize a high motor efficiency.

Moreover, the rotary shaft 4 supported by the bearings 5, 6 is movable in the axial direction, and the rotor 2 rotates with a positional displacement in the axial direction with respect to the stator 3 fixed to the housing 1. However, the amount of the positional displacement is limited within the range of the gaps secured on both sides of the bearing 5 by the support structure shown in FIG. 3 of the bearing 5 which supports one side of the rotary shaft 4.

Figure 5:
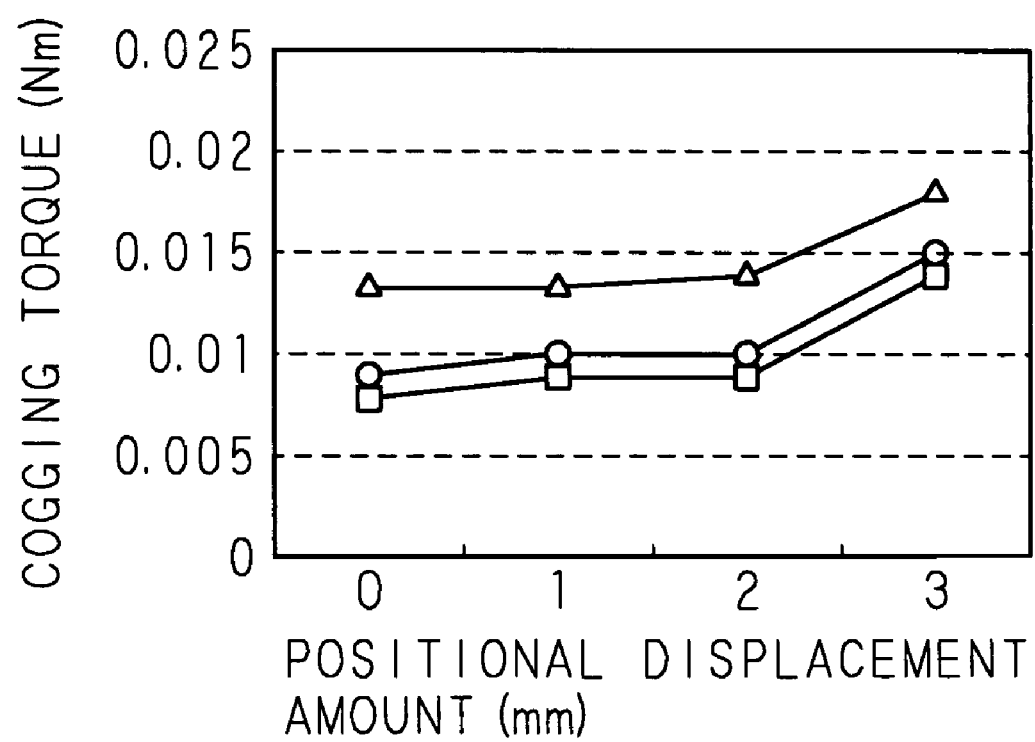
FIG. 5 is a view showing the result of examining cogging torque behavior.

When the rotor 2 rotates in a state in which a positional displacement with respect to the stator 3 is present, the influence of leakage magnetic flux at both ends in the axial direction of the stator 3 becomes larger, and there is a possibility of occurrence of above-mentioned cogging torque in which the rotational torque applied to the rotor 2 varies unstably. FIGS. 4 and 5 are views showing the results of examining cogging torque behavior.

The horizontal axis in FIGS. 4 and 5 indicates the positional displacement amount in the axial direction between the rotor 2 and the stator 3, while the vertical axis indicates the actual measurement of cogging torque generated when the brushless motor is driven in a state where the positional displacement amount varies. The square marks in FIGS. 4 and 5 show the results when the rotor length and the stator length were equal to each other; the circular marks show the results when the rotor length was 2 mm shorter than the stator length; and the triangular marks show the results when the rotor length was 2 mm longer than the stator length.

FIG. 4 shows the results for a 10-pole and 12-slot brushless motor similar to this embodiment. As shown in FIG. 4, the magnitude of cogging torque is substantially uniform under a condition where the positional displacement amount between the rotor 2 and the stator 3 is 2 mm or less. When the positional displacement amount exceeds 2 mm, the cogging torque tends to increase rapidly. It can be understood that this tendency also appears in completely the same way when the difference between the stator length and the rotor length is within a range of ±2 mm.

FIG. 5 shows the results for an 8-pole and 12-slot brushless motor. In this case, the magnitude of cogging torque is also substantially uniform under a condition where the positional displacement amount is 2 mm or less. When the positional displacement amount exceeds 2 mm, the cogging torque tends to increase rapidly. Further, in the case of the 8-pole and 12-slot brushless motor, the difference between the stator length and the rotor length also affects the cogging torque, and, when the difference is 2 mm, the cogging torque to be generated as a whole tends to be larger.

It can be understood from the results shown in FIGS. 4 and 5 that cogging torque is generated when the brushless motor rotates in a state in which there is a positional displacement between the stator 3 and the rotor 2 in the axial direction, but, in the case of a 10-pole and 12-slot, or 8-pole and 12-slot, brushless motor, that is, in the case of a brushless motor in which the ratio of slot number n to pole number p (=n/p) is within a range of 1.2 to 1.5, the magnitude of cogging torque to be generated can be maintained at a sufficiently small level by reducing the positional displacement amount between the rotor 2 and the stator 3 to 2 mm or less.

In the brushless motor, the rotating rotor 2 is movable in the axial direction, and the rotor 2 rotates in a state in which there is a positional displacement with respect to the stator 3. As described above, the positional displacement amount caused at this time is limited within the range of the gap on both sides of the bearing 5 supporting one side of the rotary shaft 4. Moreover, in order to limit the length of movement of the rotor 2, that is, the displacement amount between the stator 3 and the rotor 2 caused by this movement, to 2 mm or less, the above-mentioned gap is suitably set by adjusting the width of the bearing 5, the depth of the support hole 13, and the thicknesses of the belleville springs 16, 16.

Thus, in the brushless motor, since the rotor 2 is supported to be movable in the axial direction, it is possible to maintain the friction losses at a small level and improve the motor efficiency as described above. Moreover, since the movement amount of the rotor 2 is limited to 2 mm or less, it is possible to reduce cogging torque, and it is possible to use the brushless motor suitably in the applications requiring a small motor with stable rotation, such as a steering-assist motor in an electric power steering apparatus.

A reduction of cogging torque can be realized even under a condition where the axial length of the stator 3 and the axial length of the rotor 2 are substantially equal as shown in FIGS. 4 and 5, and there is no possibility that the brushless motor may become larger due to an increase in the length of the stator 3.

In the above embodiment, although the support structure for supporting the rotor 2 to be movable within a movable range of 2 mm is realized by the bearing 5 supporting the rotary shaft 4 on a side where the output terminal 40 is located, it may be possible to realize this structure by the other bearing 6, or both of the bearings 5 and 6.

Additionally, in the above embodiment, the belleville springs 16, 16 are resiliently brought into contact with both sides of the outer ring 51 of the bearing 5, and the rotor 2 is supported to be movable with the movement of the bearing 5 caused against the spring forces of the belleville springs 16, 16. However, it may be possible to support the rotor 2 movably by other suitable structure, such as a structure in which a belleville spring is provided only on one side, or a structure in which other resilient body such as a spring or rubber is used instead of the belleville spring.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A brushless motor comprising:
a rotor including a magnet and rotatably supported by a rotary shaft, said magnet having magnetic poles to the number of p arranged at equal intervals on an outer circumference;
a stator stationarily mounted to surround an outside of said rotor, said stator including slots to the number of n arranged at equal intervals in an inner circumference;
two bearings supporting said rotor at both ends thereof, and an outer ring of at least one of said bearings being loosely fitted to a housing; and
a resilient body disposed on both sides of the outer ring, the resilient body resiliently contacting the outer ring,
wherein the ratio n/p of n to p is set between 1.2 and 1.5,
an axial length of said rotor is substantially equal to an axial length of said stator, and
said rotor is supported so that said rotor is movable in an axial direction within a movement amount ranging from 1 mm to 2 mm by the outer ring resiliently contacting the resilient body, thereby reducing cogging torque based on a magnetic flux change due to a positional displacement in both ends in the axial direction of the rotor and the stator and reducing friction due to rotation of the rotor.

2. The brushless motor according to claim 1, wherein said bearings are two deep-groove ball bearings to which no preload is applied.

3. The brushless motor according to claim 2, further comprising said housing for storing said rotor and said stator,
wherein an inner ring of said one deep-groove ball bearing is externally fitted to the rotary shaft of said rotor.

* * * * *